Dec. 30, 1930.  G. WALTER  1,786,586
METHOD AND AN APPARATUS FOR MANUFACTURING HOLLOW BODIES
Filed Aug. 14, 1929
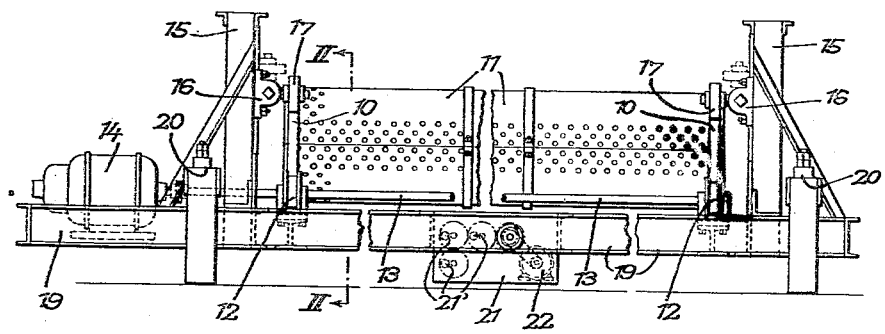
Fig. 1.
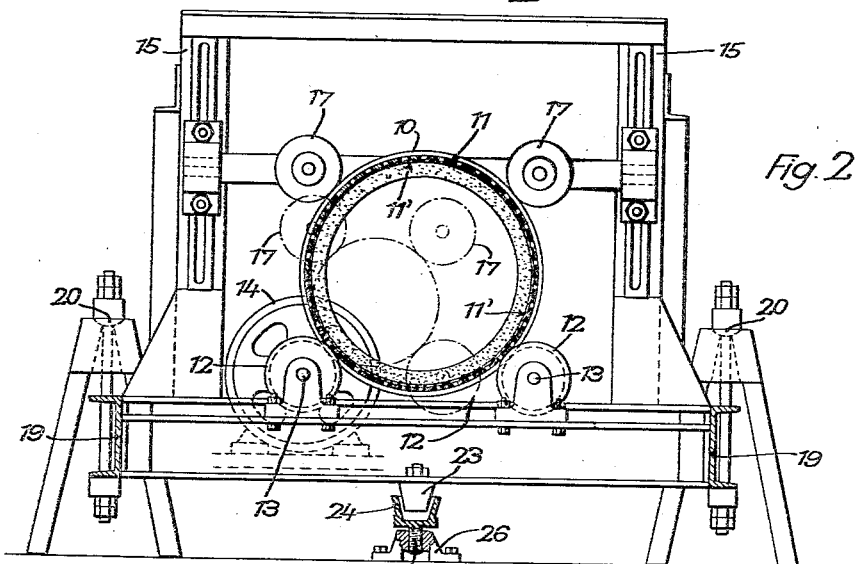
Fig. 2.
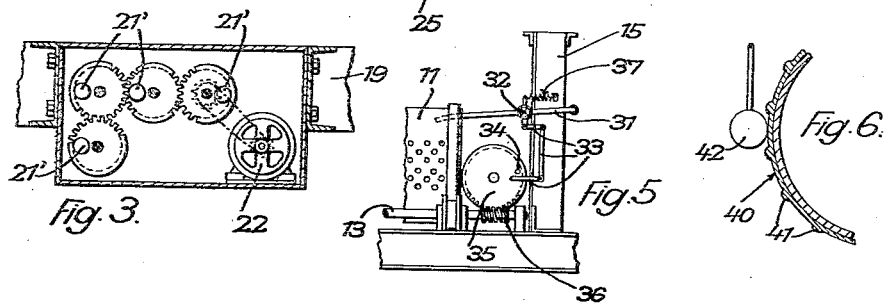
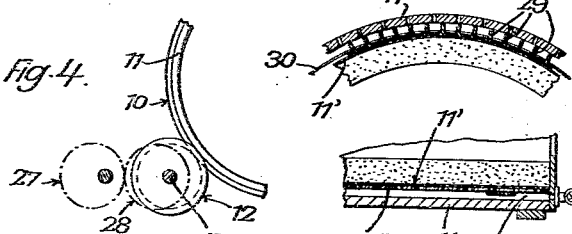
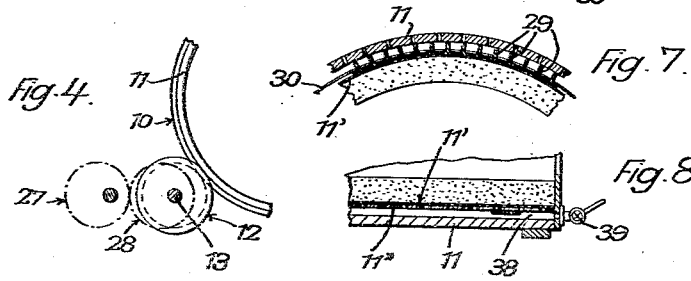
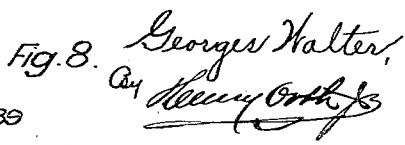
Inventor:
Georges Walter,
By Henry Orth Jr
atty.

Patented Dec. 30, 1930

1,786,586

UNITED STATES PATENT OFFICE

GEORGES WALTER, OF PERROY, SWITZERLAND

METHOD AND AN APPARATUS FOR MANUFACTURING HOLLOW BODIES

Application filed August 14, 1929, Serial No. 385,934, and in Switzerland August 18, 1928.

The present invention has reference to a method for manufacturing hollow bodies, for example tubes of agglomerated material such as concrete, with or without armature, and to a machine for carrying out the method.

The manufacture of hollow bodies, for instance tubes of concrete by the centrifugal method is known. Up to the present solid moulds have been used and the finished tubes had to remain in the moulds for several days until the concrete had set, only after that period the mould could be removed. These conditions necessitated the use of a considerable number of moulds, as every one had to be idle for several days. It has also been proposed to utilize perforated moulds, however not only the superfluous liquid but a considerable quantity of the cement escaped through the perforations of the mould during the rotation of the mould, resulting in weakening the tube and in a loss of expensive material. A further disadvantage consists in the fact that the structure did not show the desired uniformity and density as it often occurs that between bits of gravel hollow spaces are formed, thus giving rise to leakage of the finished tube.

These drawbacks are overcome by the method according to the present invention which consists in causing the superfluous liquid, to accumulate at the inner side of the shell of the hollow body bearing against the mould, and to pass through said shell by increasing the centrifugal action, whereby the hollow parts and pores are filled out by particles entrained by the liquid and in preventing these particles from escaping with the liquid by a medium which is only permeable to the liquid, whereby the whole of the superfluous liquid is driven out and the hollow bodies can be removed from the mould directly after their formation by centrifugal force is finished. The liquid forced through the layer of material acts as a lubricant and causes the larger parts of the agglomerate to properly arrange themselves on each other so that any hollow spaces previously formed disappear whereby a uniform and dense layer of material is obtained.

According to a further object of the invention this action of getting a proper arrangement of the parts of the material is assisted by subjecting the material in the mould to vibrations besides to the centrifugal action.

Another object of the invention is the provision of a machine for carrying into effect the above method.

The invention shall now be explained with reference to the accompanying drawings, which diagrammatically illustrate constructional examples of the apparatus.

In the drawings
Fig. 1 is an elevation of the machine,
Fig. 2 is a section along line II—II in Fig. 1 on a larger scale,
Fig. 3 shows in a vertical section the vibration mechanism,
Fig. 4 shows diagrammatically means for imparting angular vibrations, Fig. 5 shows an arrangement for automatically supplying a liquid to the mould.
Fig. 6 shows diagrammatically means for imparting vibrations directly to the mould.
Fig. 7 shows a cross-section through the mould and
Fig. 8 shows a longitudinal section through a part of the mould.

Referring now to the drawings the mould 11 is longitudinally divided into two parts made of sheet iron and held together by detachable annular rings 10 forming tracks for two pairs of rollers 12 by which the mould is supported. Each pair of rollers 12 is mounted on a shaft 13 and one of the latter is driven by an electric motor 14, whereby the rotation of the mould is obtained by friction between the rollers 12 and the tracks 10. On the inner side of the mould is a member 11' forming a filter and which may, for example consist of jute, cotton or other woven material; it is detachably fixed to the mould so that it can be removed from the latter.

The shafts 13 and the motor 14 are mounted on a frame 19 comprising two vertical standards 15, along which two horizontal cross-members 16 may be displaced vertically and fixed in desired positions. Each of the cross-members 16 carries two rollers

17 cooperating with the annular tracks 10 and serving to maintain the mould in its position on the rollers 12. The horizontal distance between the shafts 13 and between the rollers 17 may be adjusted to suit the size of the mould, as is shown in Fig. 2 in dotted lines for a smaller mould.

The frame 19 is suspended in four points 20 and carries a casing 21 containing a mechanism for producing longitudinal and transverse vibrations of the frame, for instance by means of cams or eccentric weights 21' rotating at high speed and driven by an electric motor 22. Means are provided to vary the frequency and the amplitude of the vibrations, which means may consist of a conical member 23 attached to the frame 19 and a hollow conical member 24 surrounding the member 23 and being vertically adjustable by means of a screw 25 cooperating with a base plate 26.

The operation of the above described machine in carrying out the method according to the invention is as follows:

The mould 11 together with the filter 11' is placed on the rollers 12 and the rollers 17 are adjusted to bear on the tracks 10, a protection wall is placed around the machine to prevent the water escaping from the mould to be splashed about.

Then the motor 14 is started and the vibration mechanism 21 may also be started so that the mould rotates at a moderate speed and is subjected to vibrations of a given frequency and of an amplitude of for instance 2-3 mm. The relatively fluid concrete is then introduced through one or the other end of the mould.

By the action of the centrifugal force the concrete places itself against the member 11' and the mould; the superfluous water which it contains collects on the inner surface of the hollow body as the centrifugal action at this moderate speed forces the gravel, the particles of sand, slag, cement, etc., which are heavier than water, towards the outer side and the filter provides such a resistance to the water that the latter can only pass the filter when the mould rotates at a higher speed and a higher pressure is imparted to the water by the centrifugal action.

The combined action of the centrifugal force and of the vibrations is as follows: The vibrations induce the gravel and the particles of different size to take up the desired relative positions which ensure a good distribution over the whole cross-section of the tube even at a moment in which the superfluous water has been separated for the greatest part from the concrete and when, without the vibrations, the consistency is already such that any relative displacement of the gravel and the particles were impossible, although the concrete has not obtained its highest compactness; the vibrations maintain the gravel and the particles in movement so that the centrifugal force causes the different elements to get into the closest contact whereby a maximum compactness is obtained. A similar facilitating of the movement of the elements is obtained by the water forced through the material, as it acts in the manner of a lubricant. If on the other hand the water should escape towards the outside during the first stage of the method the distribution of the concrete and its compactness and uniformity would not be so good. During the further stage of the method, the vibration mechanism is so regulated that it gives vibrations of a higher frequency and of smaller amplitude for instance of 1 mm.

Thereupon the speed of the mould is increased and the vibration mechanism 21' is stopped. The water which has previously accumulated at the inner surface of the tube is driven by the increased centrifugal action through the pores of the layer of material forming the shell of the tube, and passes through the filter, which retains the solid particles entrained with the water, and flows finally through the perforations of the mould and is projected against the protecting wall. The solid particles entrained by the water fill out the pores and hollow spaces and cause a material of the tube of an excellent density. The speed of the mould is then increased as high as the installation permits for finally driving out the water.

When the tube has obtained the desired degree of consistency the motor 14 is stopped, the rollers 17 are displaced, the annular rings 10 removed and the mould 11 together with the filter and the tube is removed from the machine to a place where the tube has to be deposited and the mould and the filter are taken off the tube and are placed again into the machine for manufacturing another tube.

Owing to the combined treatment by the centrifugal force and by vibration and to the complete removal of the superfluous liquid the first tube has already a consistency which permits to remove the filter immediately after the end of the manufacture and the impermeability to water is greater than with tubes made in any other manner.

In the foregoing example the centrifugal force and the vibrations act simultaneously during a certain period on the material, the periods during which the two forces act do, however, not necessarily need to be the same.

If a mould made of perforated sheet metal or of very fine metallic trelliswork is used without the filter it is found that the permeability of the mould is on the one hand not uniform and too great on the other, the quality of the tubes is impaired thereby.

The filter serves to obtain a determined permeability and eventually to maintain the tube after it has been removed from the mould, but not in order to pack the mould or to prevent adherence of the material to the mould.

The vibrations to which the mould 11 is subjected may be transverse, longitudinal or angular; the latter decreases the wear and tear of the machine and may be obtained, as is shown in Fig. 4, by means of two eccentric gear wheels 27 and 28 (elliptic or hyperbolic wheels), interposed in the drive of the roller 12. Use may be made of the combined effect of the different vibrations.

The filter member may be made of another material than a woven fabric provided it permits the water to escape but prevents the finest solid particles from escaping; it may for instance consist of paper or another fibrous material which may be brought in position in the form of a paste containing that material and a liquid, or of a material which is impermeable itself, such as thin sheet metal, provided with narrow slots cut into the metal without raising edges in the latter.

The member 11 may be arranged in such a manner that upon the removal of the mould it preserves the cylindrical form and may be removed from the tube by folding it by degrees; the separation taking place along a generatrix or a curved line running around the tube; this manner of separation does not impair the tube and it may be obtained by providing a garniture with longitudinal and annular armatures, the latter being flexible so that they can be folded in the manner of a Venetian blind. A member of this kind is illustrated in Fig. 7 in which 29 denotes the T-shaped longitudinal armatures and 30 is a steel band forming the flexible annular armature.

The member 11 may also be so arranged that when it is placed upright with the finished tube it opposes any deformation of the transverse section of the tube but does not oppose a transverse bending. In this case the member 11 cannot be permeable to water which necessitates rotating and vibrating the mould for a longer period in order to obtain similar results.

When the tube is formed and the superfluous water is removed for the greater part one or more liquids adapted to cause a quicker setting of the concrete or to improve the impermeability may be introduced into the mould. This introduction may be caused automatically at a predetermined moment; thereby manual labour is saved, a greater accuracy in the manufacture and very often an appreciable saving in the liquid employed are obtained; by introducing the liquid at a predetermined moment, for instance, after three quarters of the superfluous water contained in the concrete has been removed, one obtains a better result with a smaller quantity of liquid than when introducing too early or too late liquid in excess. A device for automatically introducing liquid into the mould is diagrammatically illustrated in Fig. 5 in which 31 denotes the pipe supplying the liquid. A cock 32 is inserted in the pipe 31 and is actuated by a lever-work 33 operated by a pin 34 on a worm-wheel 35, which is in mesh with a worm 36 on the shaft 13. When the worm-wheel 35 has completed one revolution it opens the cock 32 and liquid is automatically admitted. A compression spring 37 closes the valve 32 again.

An improvement of the impermeability of the tube may also be obtained by matters suspended in the water or in another liquid which is caused to pass through the shell of the tube.

Instead of utilizing a protection wall against splash water projected from the mould the latter may have a double shell, as is shown in Fig. 8, 11″ denoting the inner shell and 11 the outer shell of the mould. The water accumulates in the intermediate space 38 between the two shells and a valve 39 may be provided to regulate the escape of the water, the valve 39 may be actuated automatically in a similar manner as shown with the valve 32 in Fig. 5.

Obviously the mould 11 may be mounted in a manner different to that shown in Figs. 1 and 2 without departing from the scope of the present invention.

The vibrations may be imparted directly to the mould, for instance by means indicated in Fig. 6, which means include a ring 40 having projections 41 which knock against a weight 42 suspended from a fixed point of the frame. In this case the track rings 10 are mounted on rubber rings placed on the mould so that the vibrations are taken up in a resilient manner and are not transmitted to the drive.

The motor 14, which is mounted on the frame 19 in the embodiment of the invention illustrated in Figs. 1 and 2 may obviously be mounted independent of the frame 19.

The means for introducing the material into the mould may be subjected to vibrations or not.

Further means may be provided by which the variation in the speed of the rotation of the mould, the variations in the frequency and in the amplitude of the vibrations, the eventual supply of a liquid causing a quicker setting or a greater impermeability of the tube may be caused automatically at proper moments during the manufacture.

Other hollow bodies besides tubes may be manufactured according to the invention, for instance bodies of polygonal shape.

The hollow bodies may be made of another material than concrete.

I claim:

1. The method of manufacturing hollow bodies centrifugally in rotating moulds, which comprises subjecting the material to form the shell of the hollow body to a moderate centrifugal action whereby the superfluous liquid accumulates on the inner side of the shell, forcing said liquid through the shell by increasing the centrifugal action and facilitating by this flushing action the proper arrangement of the particles of the material and a filling out of the pores and hollow spaces by small particles entrained by the liquid, forcing that liquid out of the mould by the increased centrifugal action, preventing said small particles from escaping together with that liquid, the complete removal of the latter permitting the body to be removed from its mould directly after its manufacture, and subjecting said material to the action of vibrations to facilitate the proper arrangement of the particles.

2. The method of manufacturing hollow bodies centrifugally in rotating moulds, which comprises subjecting the material to form the shell of the hollow body to a moderate centrifugal action whereby the superfluous liquid accumulates on the inner side of the shell, forcing said liquid through the shell by increasing the centrifugal action and facilitating by this flushing action the proper arrangement of the particles of the material and a filling out of the pores and hollow spaces by small particles entrained by the liquid, forcing that liquid out of the mould by the increased centrifugal action, preventing said small particles from escaping together with that liquid, the complete removal of the latter permitting the body to be removed from its mould directly after its manufacture, subjecting said material to the action of vibrations to facilitate the proper arrangement of the particles, and varying the frequency and/or the amplitude of such vibrations during the production of the hollow body.

3. The method of manufacturing hollow bodies centrifugally in rotating moulds, which comprises subjecting the material to form the shell of the hollow body to a moderate centrifugal action whereby the superfluous liquid accumulates on the inner side of the shell, forcing said liquid through the shell by increasing the centrifugal action and facilitating by this flushing action the proper arrangement of the particles of the material and a filling out of the pores and hollow spaces by small particles entrained by the liquid, forcing that liquid out of the mould by the increased centrifugal action, preventing said small particles from escaping together with that liquid, the complete removal of the latter permitting the body to be removed from its mould directly after its manufacture, and supplying a substance adapted to accelerate the setting of the material.

4. A machine for manufacturing hollow bodies centrifugally, comprising in combination, a mould adapted to permit passage of a liquid therethrough, means for imparting a rotation to said mould, and filter means detachably fixed to said mould and adapted to oppose a resistance to the passage of the liquid through them and to prevent the passage of solid particles, said means comprising a member non-flexible in the longitudinal direction and flexible in the circumferential direction, and a filter cloth.

5. A machine for manufacturing hollow bodies centrifugally, comprising in combination, a mould adapted to permit passage of a liquid therethrough, means for imparting a rotation to said mould, means adapted to alter the speed of said rotation, means for subjecting the material to the action of vibrations, means adapted to vary the frequency and the amplitude of said vibrations, and means adapted to automatically actuate said means for altering the rotatory and the vibratory movement.

In testimony whereof I have signed my name to this specification.

GEORGES WALTER.